(12) United States Patent
Lentine et al.

(10) Patent No.: US 6,754,238 B1
(45) Date of Patent: Jun. 22, 2004

(54) METHOD AND APPARATUS FOR TRANSPORT OF CONTROL INFORMATION OVER A DATA LINK

(75) Inventors: Anthony L. Lentine, Holmdel, NJ (US); Ted K. Woodward, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 751 days.

(21) Appl. No.: 09/592,338

(22) Filed: Jun. 13, 2000

(51) Int. Cl.[7] ................................................ H04J 3/12
(52) U.S. Cl. ..................................... 370/528; 370/477
(58) Field of Search ............................... 370/448, 231, 370/389, 528, 522, 477, 419

(56) References Cited

U.S. PATENT DOCUMENTS 5,550,803 A * 8/1996 Crayford et al. ............ 370/246
6,009,104 A * 12/1999 Kalkunte .................... 370/448

* cited by examiner

*Primary Examiner*—John Pezzlo

(57) ABSTRACT

A method and associated apparatus for embedding control information in a data signal to be transmitted over a data link by a network node. The method comprises generation of control information to be transmitted over a data link by a network node. A signal is generated by combining the control information with the data. In a first embodiment, the data includes individual temporal packets of information such that an interpacket gap is temporally defined between said temporal packets of information. Control information is transmitted within the interpacket gap. In a second embodiment, the data is transmitted within a prescribed frequency bandwidth such that a frequency gap is defined within the frequency bandwidth. Control information is transmitted within the frequency gap. The data handling capacity of the control information is maintained in both the first and the second embodiments.

8 Claims, 9 Drawing Sheets

METHOD AND APPARATUS FOR TRANSPORT OF CONTROL INFORMATION OVER A DATA LINK

BACKGROUND OF THE DISCLOSURE

1. Field of the Invention

The invention relates to communication systems. More particularly, the invention relates to transmission of control information within communication systems.

2. Description of the Background Art

Many simple communication networks lack control information. Control information comprises routing information, network health information, node outage information, status of remote network nodes, etc. As networks have become more complex, carry more data, and are relied upon more for communication, the ability to transfer control information between nodes becomes more important.

Some networks or network portions use a communication path or line that is entirely separate from the data link to transmit control information between network nodes. Using separate control paths adds complexity and expense to networks.

In other networks or network portions, however, control information is transmitted between nodes over data links, eliminating the need for distinct control paths. Some of these networks assign a portion of the data bandwidth to carrying the control signals, which therefore modifies the transmitted data. Other networks set aside a distinct bandwidth to transmit the control signals over the data link. Because that bandwidth cannot be used to transmit other data, this method reduces overall data handling capacity for the network.

It would thus be desirable to provide a method for transmitting control information over a data link without reducing or affecting data handling capacity.

SUMMARY OF THE INVENTION

The present invention relates to a method and associated apparatus for embedding of control information in a data signal to be transmitted over a data link by a network node. The method comprises generation of control information to be transmitted over a data link by a network node. A signal is generated by combining the control information with the data. In a first embodiment, the data includes individual temporal packets of information such that an interpacket gap is temporally defined between said temporal packets of information. Control information is transmitted within the interpacket gap. In a second embodiment, the data is transmitted within a prescribed frequency bandwidth such that a frequency gap is defined within the frequency bandwidth. Control information is transmitted within the frequency gap. The data handling capacity of the control information is maintained in both the first and the second embodiments.

BRIEF DESCRIPTION OF THE DRAWINGS

The teachings of the present invention can be readily understood by considering the following detailed description in conjunction with the accompanying drawings, in which.

DETAILED DESCRIPTION

The concepts described herein could be applied to Gigabit Ethernet (GbE), Multiplexed GbE, or other types of Ethernet.

A. Network Configuration

Figure 1:
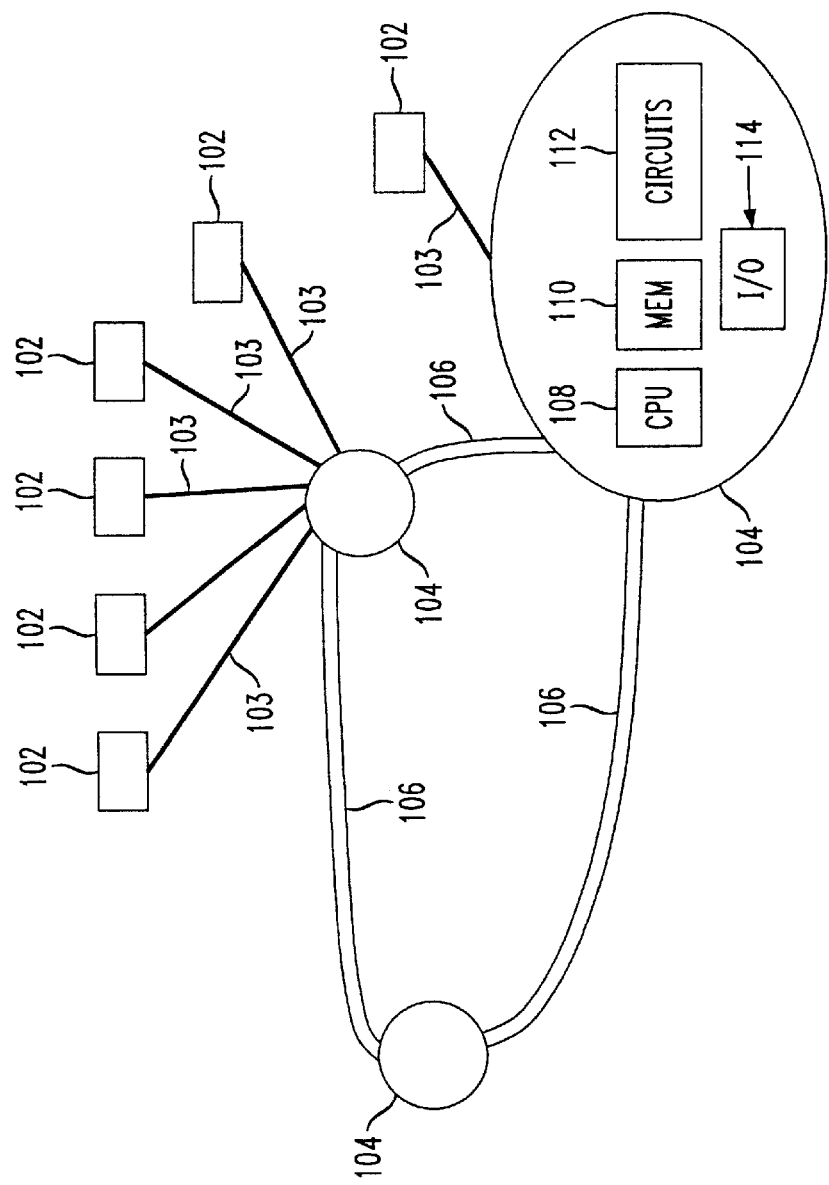
FIG. 1 is a block diagram of one embodiment of a communication network.

FIG. 1 shows one embodiment of a communication system or network 100. The communication network 100 comprises a plurality of client devices 102, a plurality of links 103, a plurality of nodes or server devices 104, and a plurality of GbE data links 106 connecting the nodes 104. Each one of the plurality of client devices 102 are preferably computers or microprocessor-based devices that utilize the communication network 100 to transmit and receive information. These client devices are well known and will not be further detailed herein. Each link 103 connects a distinct client device 102 to a node 104. Though FIG. 1 shows only two nodes 104 as being connected to any client devices, it is envisioned that many of the nodes 104 will be connected to the client device 102. The GbE data links 106 are illustrative, and any suitable data link (such as 10 GbE) may interconnect the nodes 104.

The network communicates information such as data (comprising analog or digital signals) between end users via a plurality of nodes 104. The data or analog signals are transmitted over the data links 106 node to node. The control information may include whatever type of information is desired to transmit between different nodes 104 in the communication network, excluding the data.

Control information is used to control the interoperability of different nodes within a network 100. For instance, propagating link integrity information, status inquiry information for remote nodes, network management information, network configuration information, routing information, network health information, node outage information, etc. between nodes in the communication network 100 may be desired. It may also be desirable to carry other types of low-bandwidth traffic over the GbE data link 106. For instance, in a network otherwise devoted to communicating data traffic, one might wish to include voice-band telephone, so-called plain-old-telephone service (POTS) service in the data link.

This invention generates a signal comprising combined control information and data. The signal is at least partially contained within the same bandwidth as the data while the data handling capacity of the data is maintained. Frequency domain, time domain, and code domain signal processing techniques may be used to generate the signal.

The control information to be transmitted over the GbE data links 106 may use either digital or analog signal processing techniques. Insertion of the control information into the data in these embodiments does not disturb or modify the already standardized GbE data or signaling structure. Furthermore, these embodiments do not use any additional channel bandwidth within the GbE data links 106 to carry the control information.

The node 104 may take the form of a general-purpose computer, a microprocessor, a micro controller, or any other known type of computer. The node comprises a CPU 108, a memory 110, circuits 112, and input-output (I/O) 114. CPU 108 perform the processing and arithmetic operations for the node 104. CPU 108 is preferably of a type produced by Intel, Texas Instruments, Motorola, Advanced Micro Devices, or other such companies, whose operation is generally known to those skilled in the art. The memory 110 includes random access memory (RAM) and read only memory (ROM) that together store the computer programs, operands, and other parameters that control the respective transmission and reception of data and control information within the node 104. The FIG. 1 embodiment is described as utilizing GbE data links 106. It is envisioned that the aspects of combining data and control information may utilize any form of data link. One example of such a data link is provided in U.S. patent application Serial No. 60/124293 (Provisional), filed Mar. 12, 1999 to Banerjee et al.

I/O 114 provides an interface to control the transmissions of digital information to and from each of the respective node 104 over the GbE data links 106 or the data links 103. Circuit portions 112 comprise all of the other user interface devices (such as display and keyboard), system devices, and other accessories associated with the respective node 104.

Multiple illustrative embodiments of the communication network 100 are now detailed. These embodiments provide various non-exhaustive techniques in which control information can be inserted into existing data that is being transported between nodes 104 in communication network 100.

B. Interpacket Gap Transmission Technique

Figure 5:
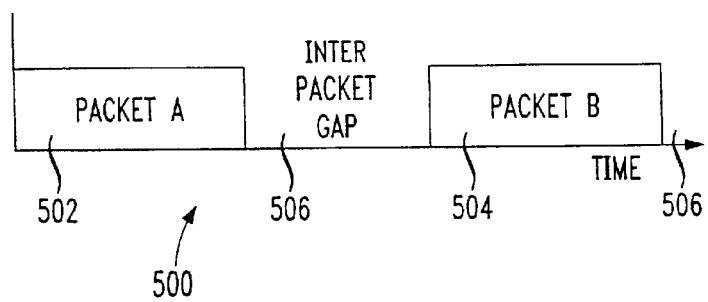
FIG. 5 is a graph of one embodiment of time versus packet transmission within a data link.

FIG. 5 is an illustrative graph of packets being transmitted versus time within a GbE data link 106. Packet A 502 is transmitted, followed by a brief interpacket gap 506, and finally packet B 504. This process of generating data packets separated by an interpacket gap is repetitive such that there is an interpacket gap defined between each successive pair of packets 502, 504. In GbE Ethernet, the minimum interpacket gap 506 is 64 nSec. Other types of Ethernet, such as 10 GbMux Ethernet have an interpacket gap. The interpacket gap contains characters for start of packet, disparity, and clock synchronization. By using the gap to carry control information, the insertion of the control information into the data to form the signal does not affect the data carrying bandwidth, or data throughput.

Figure 2:
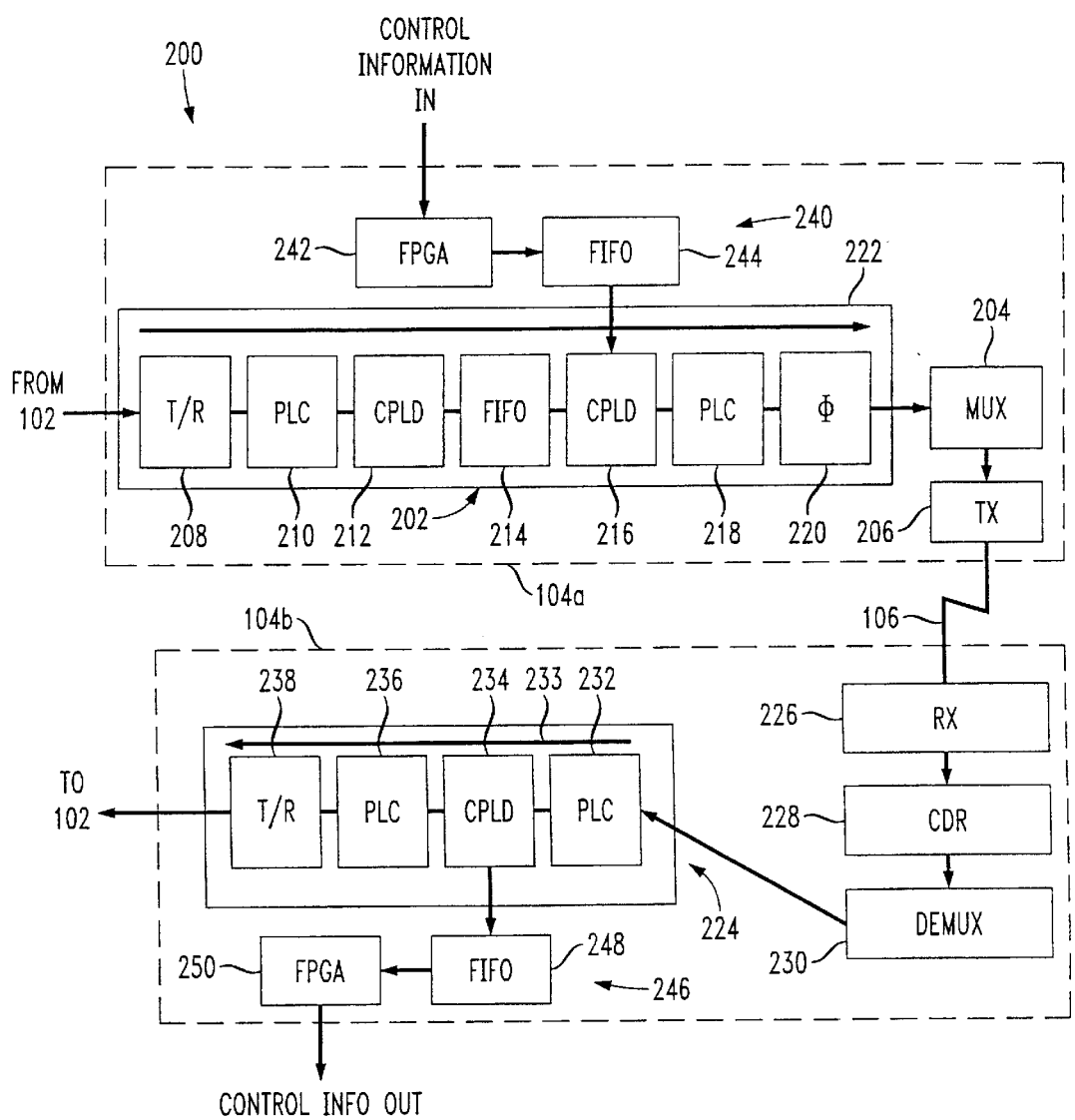
FIG. 2 is an expanded block diagram of one embodiment of control information transport system located within the network of FIG. 1.

FIG. 2 depicts a block diagram of a time domain control information transport system 200 that is configured to transmit control information within the 64 nSec interpacket gap 506 of FIG. 5. This time domain control information transport system 200 comprises a transmitting node 104a connected to a receiver node 104b by GbE data link 106. The components shown in the transmitter node 104a in FIG. 2 are one embodiment of the components used to transmit data and control information over the GbE data link 106. The components shown in the receiver node 104b are one embodiment of the components used to receive data and control information over the GbE data link 106. The transmitter node 104a and the receiver node 104b are shown as including different components. In actuality, each node 104 in FIG. 1 comprises the components of both the transmitter node 104a and the receiver node 104b since each node both transmits and receives signals.

The transmitter node 104a comprises a GbE portion 202, a control information input portion 240, a multiplexer 204, and a transmitter 206. The GbE portion 202 comprises a transmitter/receiver 208, a physical layer converter (PLC) 210 that is also known as a commercially available serialarizer/deserializer (SERDES), a Complex Programmable Logic Device (CPLD) 212, a First-In First-Out (FIFO) buffer 214, a CPLD 216, a PLC 218, and a phase shifter (Φ) 220. The control information input portion 240 comprises a field programmable gate array (FPGA) 242 and FIFO 244.

The receiver node 104b comprises a receiver 226, a clock and data recovery CDR 228, a demultiplexer 230, a GbE portion 224, and a control information output portion 246. The GbE portion 224 comprises a PLC 232, a CPLD 234, a PLC 236, and a transmitter/receiver 238. The control information output portion 246 comprises FIFO 248 and field programmable gate array 250.

Data is received from a client device 102 through the transmitter/receiver 208. For data being transmitted from a transmitter node 104a to a receiver node 104b, data is processed within the GbE portion 202 in a direction indicated by arrow 222. Data received by the transmitter/receiver 208 is passed to the PLC 210 where the data is deserialized into a parallel form that can be utilized by the CPLD 212. The CPLD 212 provides valid data packets (that do not include the interframe gap) into the FIFO buffer 214. Clock synchronization between the control information (received over control information input portion 240) and the data is accomplished using the FIFO buffer 214.

The CPLD 216 monitors the FIFO output by reading valid data at the synchronous system clock rate of 125 MHz for GbE. The CPLD 216 performs the logic described below in FIG. 3 to determine where to insert control information into an interframe gap of the data. The CPLD also provides a flag character to indicate to the receiver node 104b the location and existence of the control information within the combined data and control information transmitted over the data link 106. The PLC 218 serializes data for multiplexing. The phase shifter 220 shifts the frequency of the data to be received by the receiver node 104b. The FPGA 242 produces bytes of control information that are of sufficient size that they can be inserted into an interframe gap. The FIFO 244 acts as a buffer of control bytes to be inserted into the CPLD 216.

Only one GbE portion 202 is shown in FIG. 2. However, it is envisioned that a transmitter node 104a may actually comprise a plurality of GbE portions, for example eight. Each one of the eight GbE portions 202 would be in communication with a distinct client device 102. Since each GbE would be capable of operation at 1.25 Gbytes, a transmitter portion 104a comprising eight GbE portions is capable of a transmission rate of 10 Gbytes. An example of such a node is described in the above U.S. patent application that was incorporated by reference above. In a similar manner, there are actually a plurality (such as eight) of GbE portions 224 in the receiver node 104b even though only one is depicted. Each GbE portion 224 in the receiver node 104b is connected to a distinct client device 102.

Multiplexer 204 multiplexes the signals (including data plus the control information) from each of the eight GbE portions 202 into a single signal. The transmitter 206 transmits the multiplexed signal over the GbE data link 106 to the receiver portion 104b. At the receiver portion 104b, the receiver 226 receives the signal over the GbE data link 106. The CDR synthesizes or recovers the clock from a data stream that does not explicitly contain the clock. The clock is needed for signal retiming. The demultiplexer 230 demultiplexes the signals based upon which one of the eight GbE portions 224 should receive that signal.

When a signal comprising the data packets, together with the control information transmitted in the interpacket gap, is received by the GbE portion 224, data travels in a direction generally indicated by arrow 233. The PLC 232 initially deserializes the signal in a form that can be processed by the CPLD 234. The CPLD 234 uses the method depicted in FIG. 4, described below, to remove control information from the signal input thereto, and forwards the control information to the FIFO 248 while forwarding the data to the PLC 236. The PLC 236 serializes the data in a form that can be input to the transmitter/receiver portion 238 such that data can be transmitted serially over a data link 103. The transmitter/receiver portion 238 transmits the data to the client device 102 associated with that particular GbE portion 224.

The FIFO 248 buffers the control information output by the CPLD 234, and synchronizes the input of the data into the FPGA 250. The FPGA 250 reconverts the control bytes of information (as originally converted by FPGA 242) into control information. The control information is in the form that can be utilized by the nodes 104.

Figure 3:
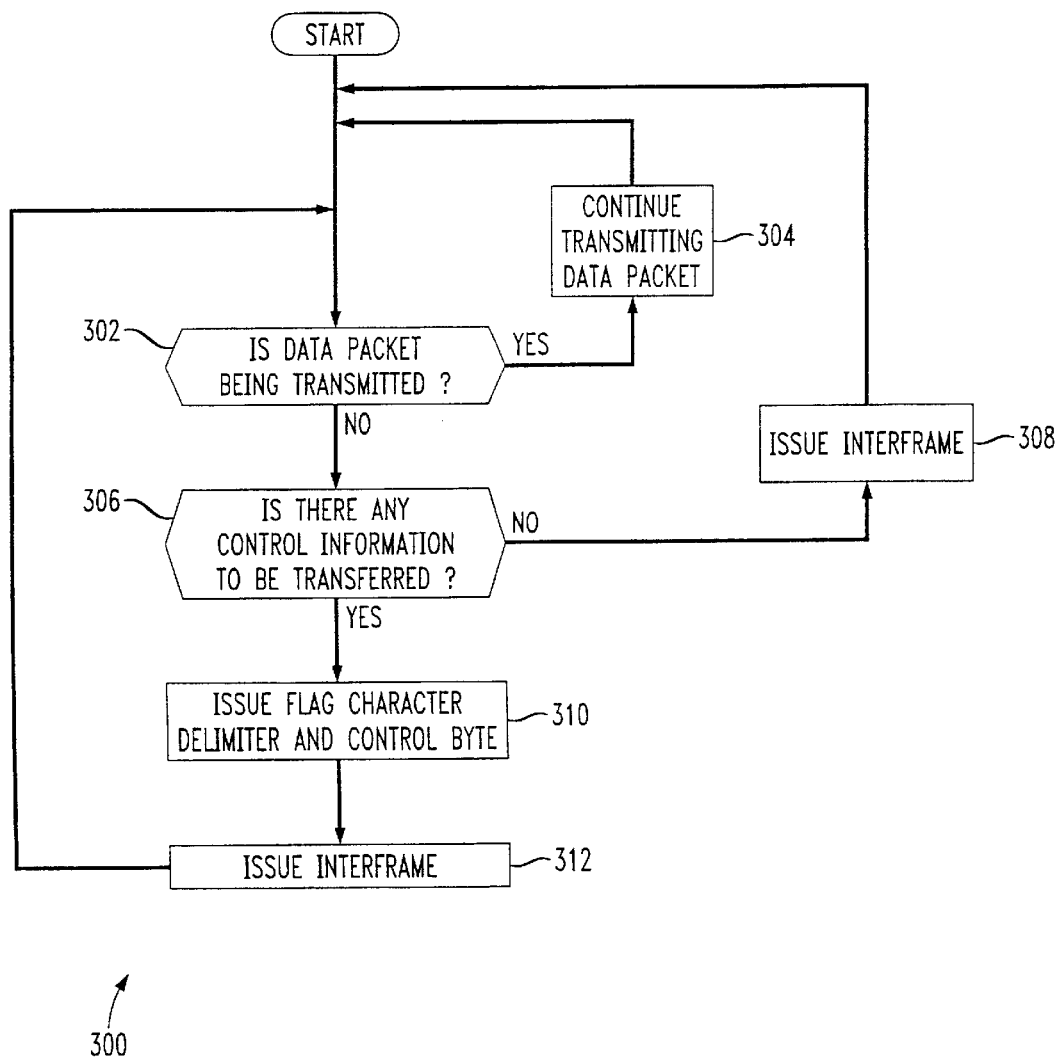
FIG. 3 is a flow chart of one method of transmitting control information within an interpacket gap.

FIG. 3 displays one embodiment of method 300 performed by the transmitter node 104a in which control information is inserted between successive packets of data within an interframe packet. This, in turn, is transmitted over a GbE data link 106 connecting nodes 104 to one another. The method 300 is performed by the CPU 108 and the memory 110 (see FIG. 1) of a transmitter node 104a (see FIG. 2). The method 300 begins with decision block 302 in which the transmitter node 104a determines if data is presently being transmitted to the GbE data link 104a. The data takes a form of a packet as shown in FIG. 5. If answer to decision block 302 is YES, then the transmitter node 104a continues transmitting information packet as shown in block 304. Decision block 302 and block 304 form a waiting loop that continues until the entire packet has completed its transmission. An interpacket gap follows each data packet transmission.

If the answer to decision block 302 is NO, then method 300 continues to decision block 306 in which the transmitter node 104a determines if there is any control information to be transmitted. Data contained in FIFO buffers such as 244 or 214 contain flags in prescribed header locations to indicate the existence and type of data to be transmitted. The CPLD 216 of the transmitter node determines if there is any information to be transmitted by monitoring FIFO buffer 244 and the FIFO buffer 214 for any such flag. If the answer to decision block 306 is NO, then the method 300 will issue an interframe packet that defines the interframe gap as shown in block 308. Following block 308, method 300 loops to decision block 302.

If the answer to decision block 306 is YES, then the transmitter node 104a issues a flag character delimiter and the control byte. The flag character delimiter is used by the receiver node 104b to determine when control information is being transferred. The control byte contains the control information that is to be transferred. There may be more control information that is buffered to be transmitted over the GbE data link, but only a single control byte is transferred in a single interframe gap due to the limited time duration of the interframe gap. Of course, if it is desired to transmit more than one control byte in an interframe packet, this could be accomplished by coupling multiple control bytes in the transmitter node 104a, provided that the interframe gap is long enough and that the receiver node 104b is configured to handle the multiple control bytes. Following block 310, method 300 continues to block 312 in which the transmitter node 104a issues an interframe packet 312. Following block 312, the method 300 loops back to above decision block 302. The logic of method 300 is performed by the CPU 108 (FIG. 1) in the transmitter node 104a.

Figure 4:
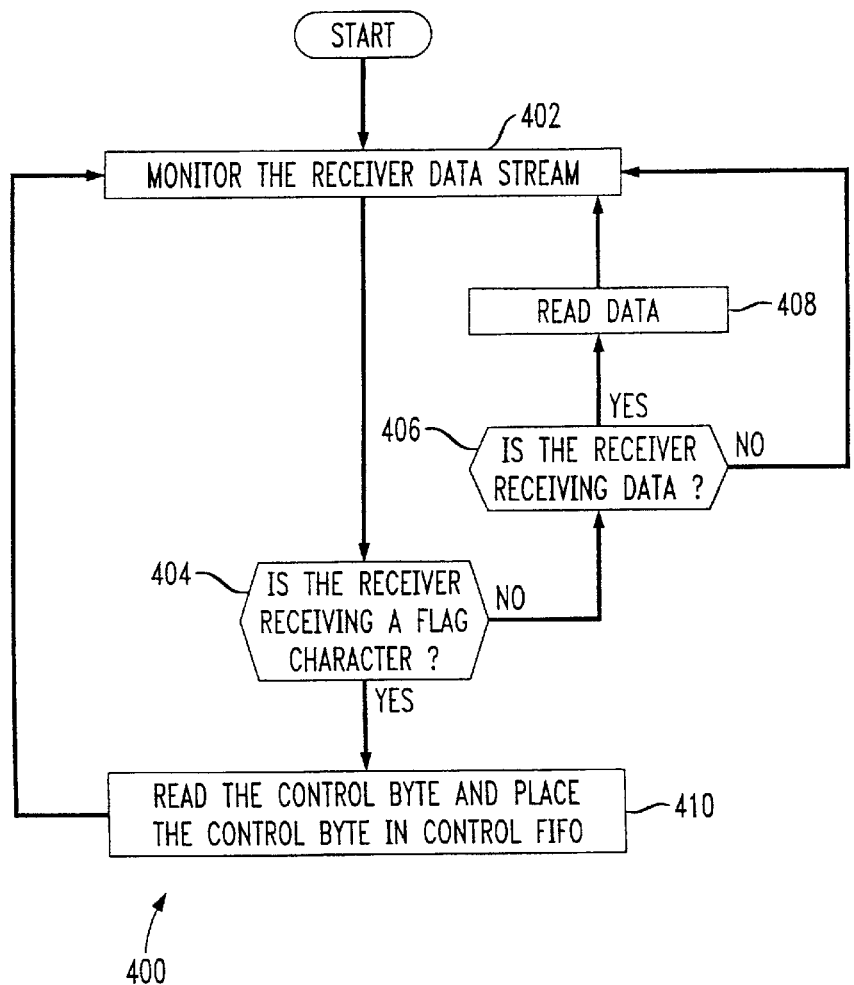
FIG. 4 is a flow chart of one method of receiving control information that has been transmitted by the method shown in FIG. 3.

FIG. 4 shows one embodiment of method 400 that is utilized by the receiver node 104b in conjunction with method 300 of the transmitter node 104a. Method 400 begins at block 402 in which the receiver node 104b monitors the GbE data link 106 for data, as well as for control information. The method continues to decision block 404 in which the receiver node 104b determines if the receiver is receiving a flag character delimiter to indicate a control byte of control information is now being received by the receiver node 104b over GbE data links 106. The flag character delimiter is issued in block 310 of FIG. 3. If the answer to decision block 404 is NO, then the method 400 continues to decision block 406 in which the receiver node 104b determines if it is receiving data. If the answer to decision block 406 is NO, then the method 400 loops to block 402. If the answer to decision block 406 is YES, then the method 400 continues to block 408 in which the data (in the form of a packet) is read by the receiver node 104b. Following block 408, the method 400 continues to block 402.

By comparison, if the answer to decision block 404 is YES, then method 400 continues to block 410 in which the receiver node 104b reads the control byte and places control byte in the control FIFO. Following block 410, the method 400 loops back to block 402. In this manner, method 400 indicates how the receiver node 104b receives and handles both data and control information. The logic of method 400 is performed by CPU 108 located in the receiver node 104b (FIG. 1).

C. Multiple Subcarriers or a Low Frequency Subcarrier Transmission Technique

Figure 7:
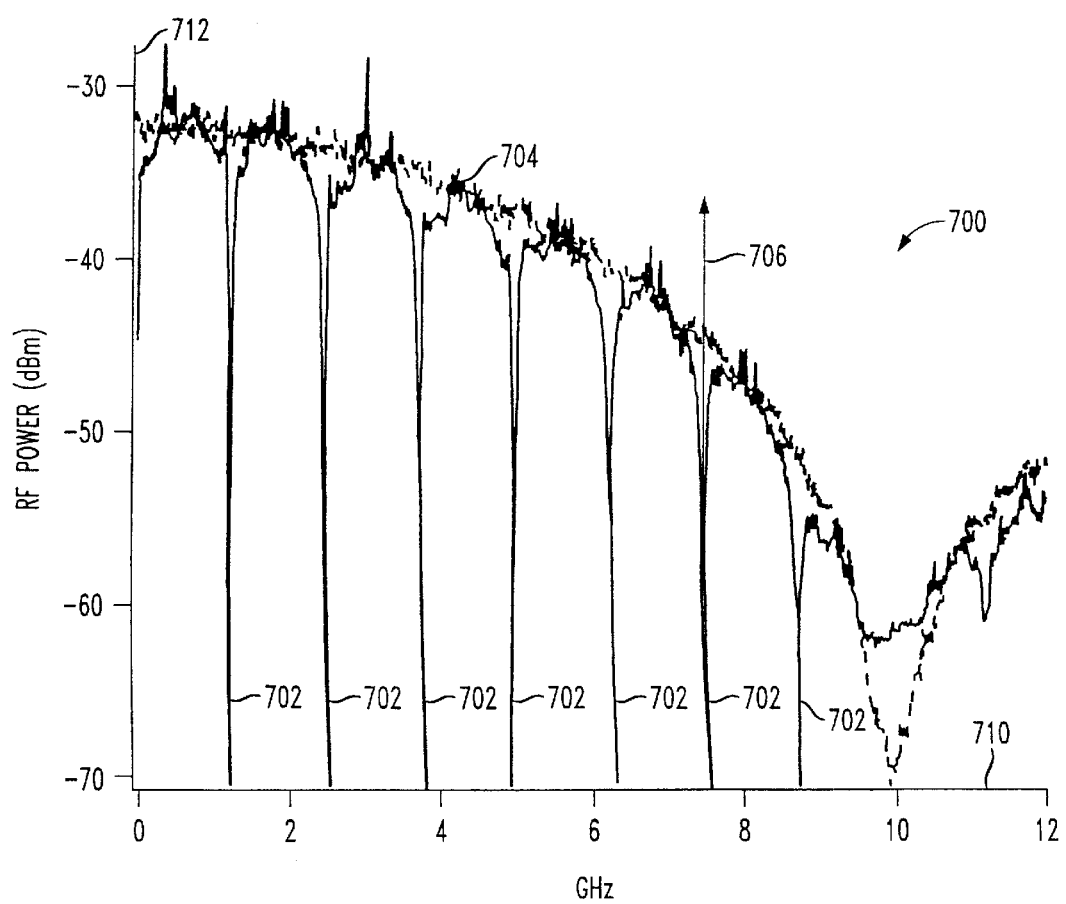
FIG. 7 is an illustrative RF power vs. frequency graph of one embodiment of a signal transmitted within the frequency domain control data transmission system shown in FIG. 6.

One embodiment of an amplitude versus frequency graph 700 is shown in FIG. 7, with the abscissa 710 representing frequency in GHz and the ordinate 712 representing the RF power of the signal in dBm. The graph 700 depicts a multiplexed output spectrum of the transmitter node 104a as transmitted over the GbE data link 106 of FIG. 1 is shown in FIG. 7. This graphed signal does not have one, but eight frequency minima that are separated by frequencies having multiples of 1.25 GHz in the RF spectrum. It is therefore possible to introduce eight subcarrier signals (each subcarrier signal carrying control information at the frequency minima) into the output spectrum. This insertion of the eight subcarrier signals provides additional capability to carry signaling and control information.

Figure 6:
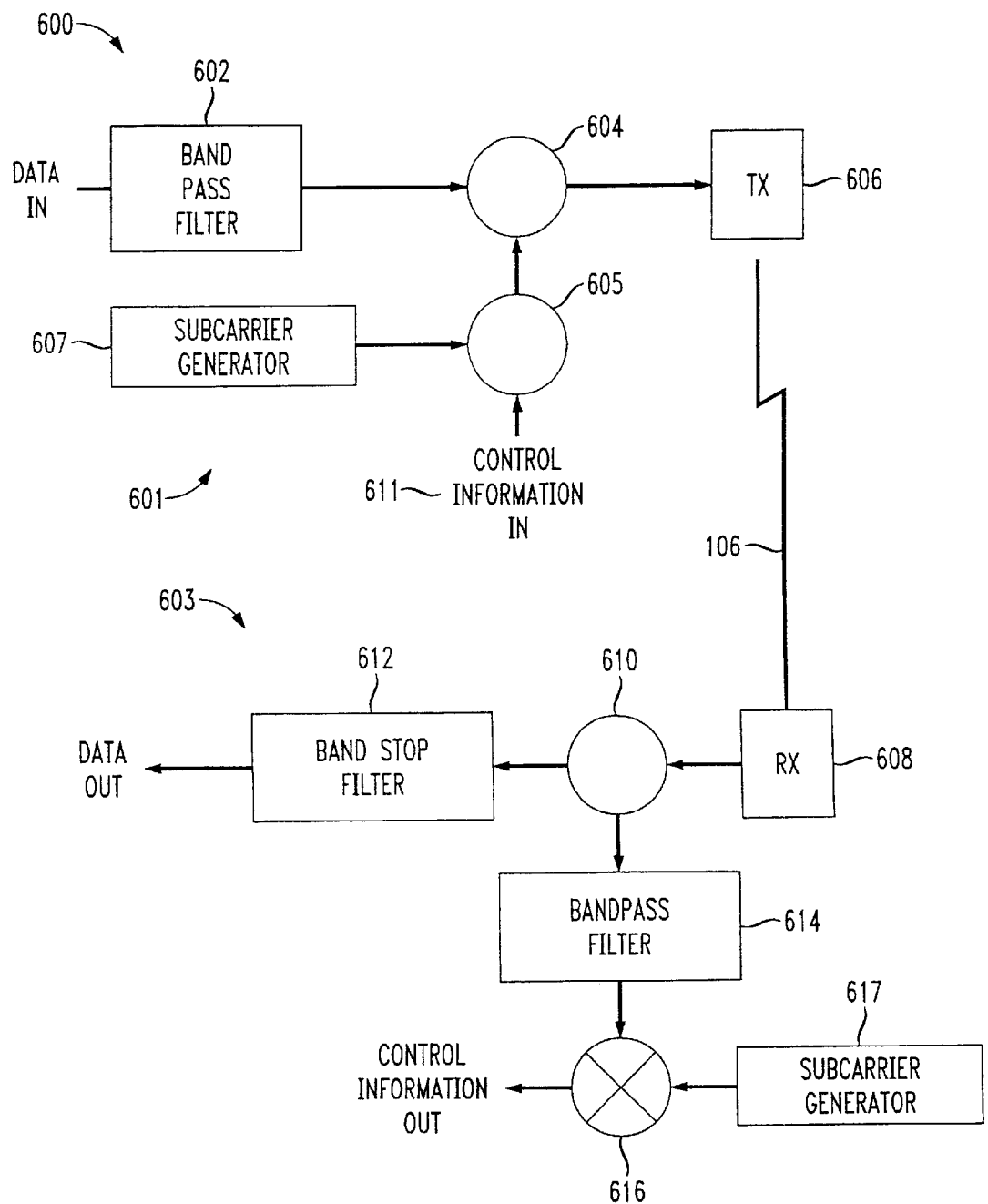
FIG. 6 is a block diagram of one embodiment of a frequency domain control data transmission system located within the network of FIG. 1.

FIG. 6 shows one embodiment of a frequency domain control information transmission system 600 that can insert signals into the frequency minima locations shown in the graph 700 shown in FIG. 7. The frequency domain control information transmission system 600 comprises a transmitter portion 601 and a receiver portion 603. The transmitter portion 601 comprises a band pass filter 602, a combiner 604, a modulator 605, a subcarrier generator 607, a control-in 611, and a transmitter 606. The receiver portion 603 comprises a receiver 608, a splitter 610, a band stop filter 612, a band pass filter 614, a control-in 611, a subcarrier generator 617, and a demodulator 616.

The band pass filter 602 removes a narrow frequency range, or a plurality of narrow frequency ranges for the data signal corresponding to the frequency minima at which it is desired to transmit the control information. The remainder of the data is permitted to pass through the band pass filter 602. A subcarrier generator 607 applies a subcarrier to the modulator 605. A control-in 611 applies control information to the modulator 605. The subcarrier modulates the control information in modulator 605. The frequency of the subcarrier matches the frequency of one of the filtered frequency minima. The combiner 604 combines the filtered data from the band pass filter 602 with the modulated control information input from modulator 603. Combiner 604 inserts the modulated control information 706 into the data signal spectrum at the filtered frequency minima. For example, in FIG. 7 a subband signal carrying control information is shown inserted into the second frequency minima from the right. Since the frequency widths of the data signal 704 or of the sub bands 702 are relatively narrow (in the order of less than 20 MHz, the information carrying capability of the data signal 704 is not affected.

The output of the combiner 604 is input into transmitter 606. The transmitter 606 transmits over the GbE data link 106 to the receiver portion 603, and more specifically to the receiver 608. The output from the receiver 608 is fed into the splitter 610 that splits the signal received into two outputs. One of the output goes to the band stop filter and the other output goes to a bandpass filter 614. The splitter 610 is preferably a 3dB splitter so both outputs receive substantially identical signals comprising both data and control information components.

The band stop filter 612 removes undesired frequencies of data (particularly those that are at frequencies corresponding to the frequency minima 702 in FIG. 7). The output of the band stop filter 612 is the data signal. Another output of splitter 610 feeds to bandpass filter 614, which only passes the frequencies corresponding to the frequency minima shown in FIG. 7. The bandpass filter 614 output is coupled to demodulator 616. A subcarrier generator 617 applies a low subcarrier signal to the demodulator 616. In the demodulator 616, the control information 706 is demodulated from the input control signal using the low subcarrier signal.

Figure 8:
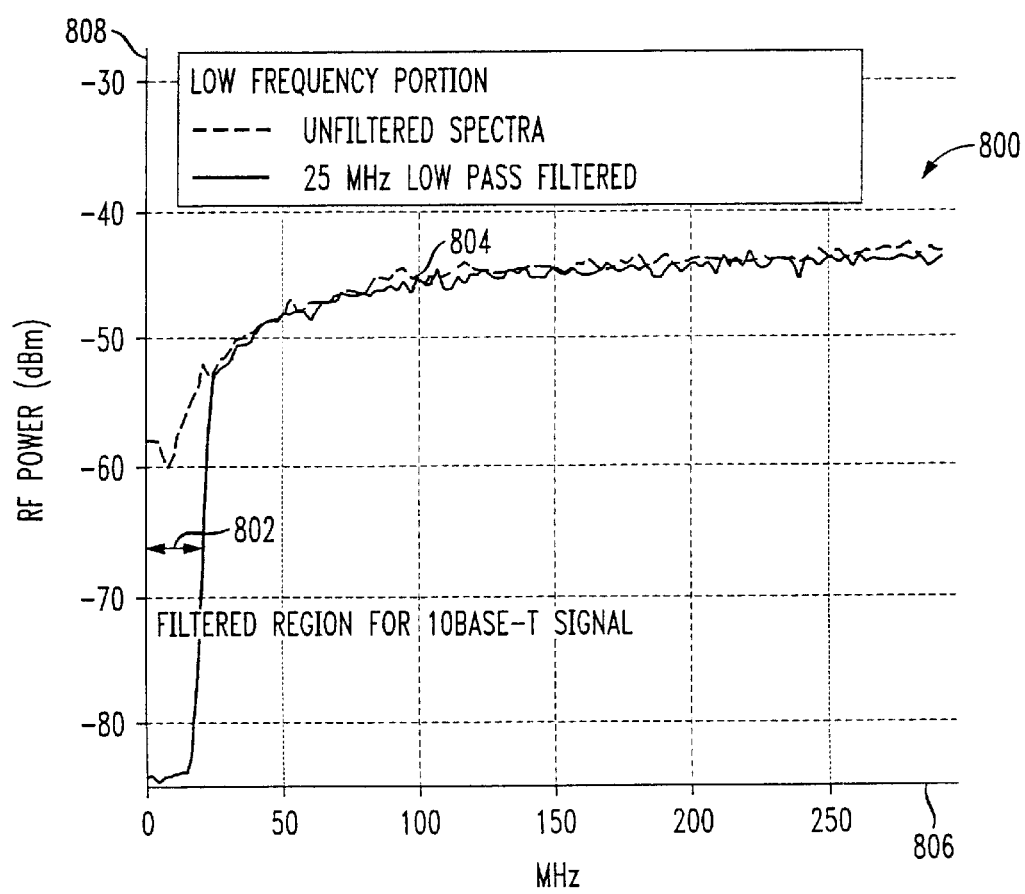
FIG. 8 is an illustrative RF power vs. frequency graph of another embodiment of a signal transmitted within the frequency domain control data transmission system shown in FIG. 6.

FIG. 8 is a graph 800 in which the abscissa 806 represents the frequency of the data 804 in kHz, and the ordinate 808 represents the RF power in dBm. The graph 800 may be viewed as a low frequency portion of the graph 700 shown in FIG. 7. In FIG. 8, a baseband portion 802 of data 804 is removed by filtering, within which the control information can be inserted for transmission. Modulated control information can be inserted in both the baseband 802 in FIG. 8 and the frequency minima 702 in FIG. 7, both of which may be considered signal processing within the frequency domain. They also represent one embodiment of analog control information insertion technique. The baseband portion 802 in FIG. 8 is Ethernet compatible since it allows for transfer of Ethernet-based information.

The FIG. 6 frequency domain control information transmission system 600 can be used to transmit signals indicated in the FIG. 8 embodiment. Data is inserted in the filtered baseband 802 of the GbE spectrum.

One embodiment of control information that can be carried as the data baseband transmitted over a GbE data link is a 10 Mb/s Ethernet signal (commonly referred to as a 10-BaseT signal). This control information has a frequency bandwidth of roughly 20 MHz considering that Manchester-coding is used in Ethernet transmission. It could be readily inserted into the baseband data signal to form a composite signal (data plus control information) that can be transmitted over GbE data link 106 as indicated in FIG. 8.

D. Spread Spectrum Transmission Techniques

The spectral energy of the control information may be spread by means of well-known spread-spectrum techniques to occupy a larger portion of the RF spectrum. The signal amplitude in any specific spectrum bandwidth used to carry the control information is reduced. Therefore the potential for interference with the communications data traffic is also reduced. CDMA, and other spread spectrum communication techniques are generally known, an example is provided in Introduction to Spread Spectrum Communications, Peterson et al., published by Prentice Hall (incorporated herein by references).

Figure 9:
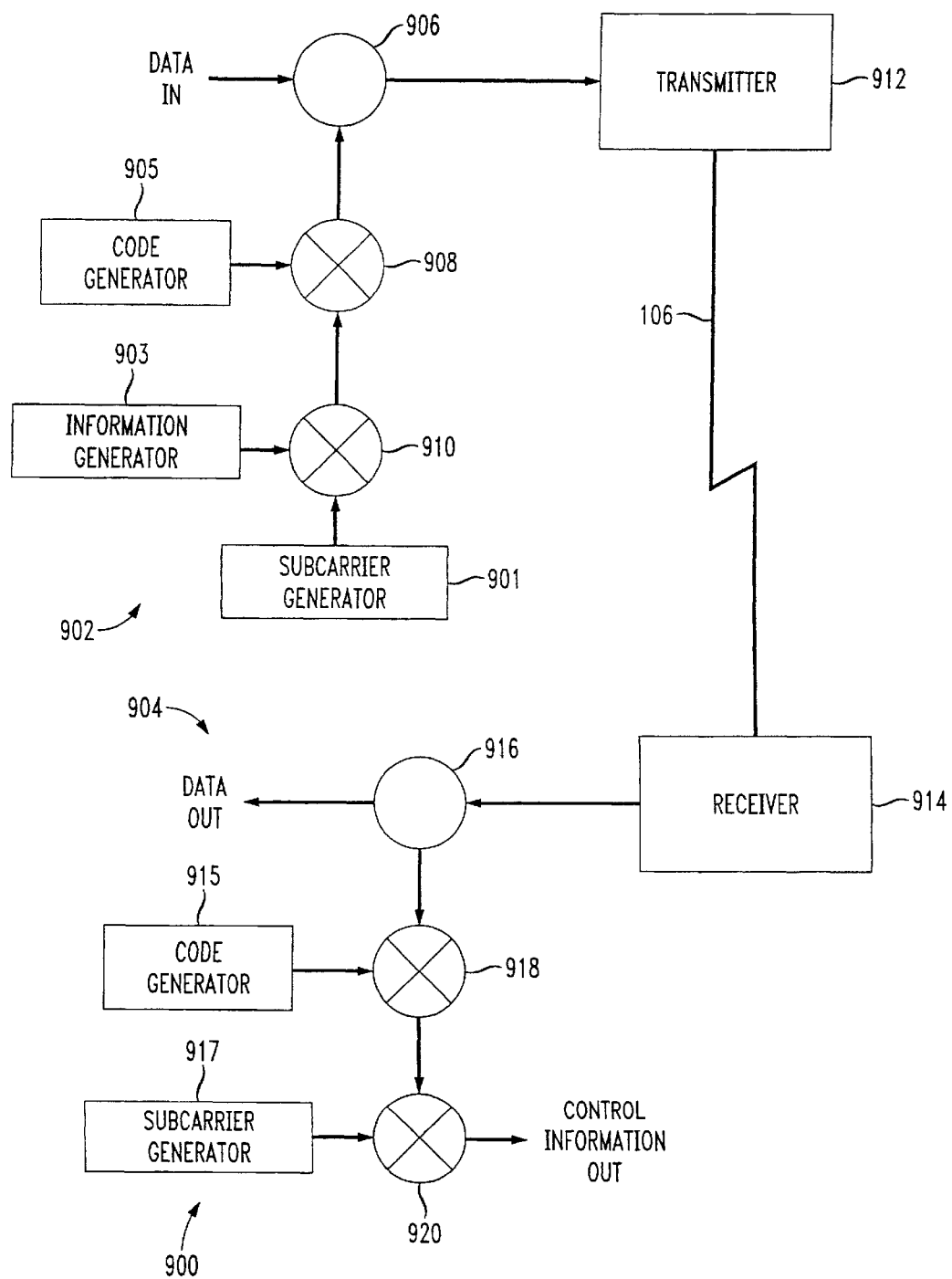
FIG. 9 is a block diagram of one embodiment of code domain control data transmission system located within the network of FIG. 1.

FIG. 9 shows one embodiment of code domain control information transmission system 900. It comprises a transmitter portion 902 and a receiver portion 904. The transmitter portion 902 comprises a combiner 906, a code generator 905, an information generator 903, a subcarrier generator 901, a spreading mixer 908, a modulator 910, and a transmitter 912. The receiver portion 904 comprises a receiver 914, a code generator 915, a splitter 916, a subcarrier generator 917, a despreader 918, and demodulator 920.

Figure 10:
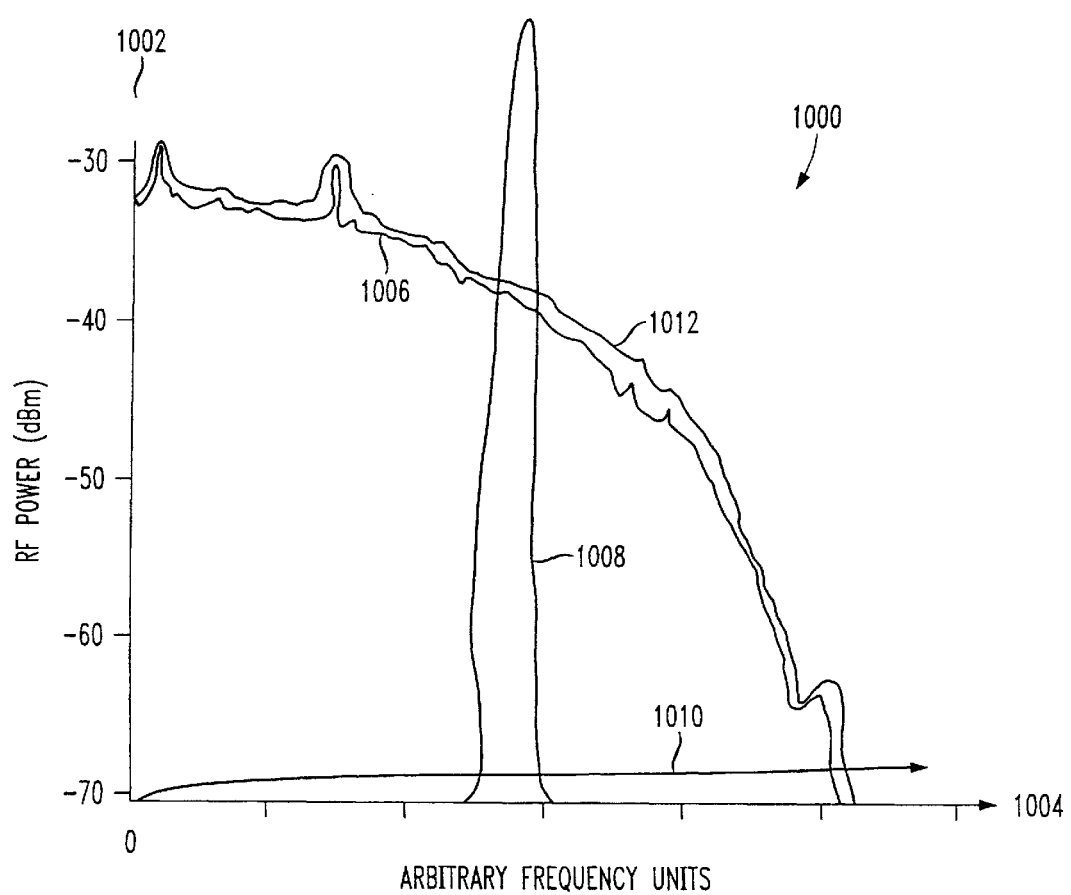
FIG. 10 is an illustrative RF power vs. frequency graph of an embodiment of signal transmitted within the code domain control data transmission system shown in FIG. 9.

FIG. 10 shows a graph 1000 plotting frequency as the abscissa 1004 versus RF power as the ordinate 1002. Data is shown as 1006. Control information is shown as 1008. The control information 1008 has sufficient power such that it would distort the data 1006 if the two signals were directly combined. The control information 1006 is spread using a spreading code produced by code generator 905 in FIG. 9 using known spread spectrum techniques. The resulting spread control information is shown as 1010. The spread control information has a lower amplitude, but much greater frequency spread, than the original control information. The spread control information 1010 is combined with data 1006 to provide resulting signal 1012. The data and the control information can both be reconstructed from the signal 1012 using known spread spectrum techniques.

The information generator 903 applies control information to the modulator 910. The subcarrier generator 901 apples a subcarrier to the modulator 910. In modulator 910, the subcarrier is modulated by the control information. The modulated control information output of modulator 910 is coupled to the spreading mixer 908. The code generator 905 applies a prescribed spreading code to the spreading mixer 908. The modulated control information is frequency spread based upon the spreading code. Pseudocode generators are sometimes used to generate these spreading codes. The spreading mixer 908 increases the frequency bandwidth at which the modulated control signal exists; however, the amplitude of the control information at any one of the individual frequencies is diminished. The spreading mixer converts the control information 1008 into the spread control information 1010 as shown in FIG. 10. The output of the spreading mixer 908 is sent to a combiner 906 which combines the spread modulated information with the data to form a composite signal. The output of the combiner 906 is then sent to the transmitter 912. The transmitter 912 transmits a signal over the GbE data link 106 that is received by the receiver 914 of the receiver portion 904.

The output of the receiver is coupled to the splitter 916. The splitter transmits part of the signal received from receiver 916 as data to be further processed. The control information contained in the output data signal may be treated as noise, and removed accordingly. The splitter 916 is preferably a 3 dB splitter. The splitter 916 also outputs the signal containing the combined control information and data into the despreader 918 (often called a signal correlator). The code generator 915 also inputs a spreading code typically generated by a pseudorandom code generator (corresponding to the spreading code produced by code generator 905 that also has a pseudorandom code generator) into the despreader 918. Based upon the spreading code, the input into the despreader obtains an unspread signal corresponding to the control information with the data portion of the signal removed. The output of the despreader 918 as well as the subcarrier are both input into the demodulator 920. The subcarrier generator 917 inputs a subcarrier signal into the demodulator 920. The demodulator 920 demodulates the control information using the subcarrier.

E. Conclusion

The foregoing embodiments of the invention permit control information to be transmitted within the same frequency bandwidth that is used as data transmission that is being transmitted. Frequency domain, time domain, or code domain techniques can be used. The invention utilizes the GbE data link in such a manner as to minimize interference with the data being transmitted in that GbE data link while effectively transmitting control information. As such, the forgoing embodiments of the invention describe a communication network 100 capable of conveying control information within arbitrary and complex network configurations.

What is claimed is:

1. A method for transport of control information and data over a data link, comprising:

generating a signal by combining the control information with the data, wherein the data includes individual temporal packets of information, wherein an interpacket gap is temporally defined between said temporal packets of information, wherein control information is transmitted over the data within said interpacket gap, and wherein the data handling capacity of the data link is maintained.

2. The method of claim 1, wherein the data link comprises a Gigabit Ethernet data link.

3. The method of claim 1, wherein the data link comprises a multiplexed Gigabit Ethernet link.

4. The method of claim 1, wherein the temporal duration of the control information is either arbitrary or under the control of the user.

5. The method of claim 1, further comprising:

receiving the combined signal; and separating the control information from the data in the combined signal.

6. An apparatus comprising:

a combiner device that generates a signal defined by a series of data packets separated by an interpacket gap, the combiner device inserts the control information into said interpacket gap; and a transmitter device that transports the signal over a data link;

wherein the data handling capacity of the data link is maintained.

7. The apparatus of claim 6, further comprising a splitter device that receives the signal, and splits off control information from data contained within the signal.

8. An apparatus comprising:

a first node;

a second node;

a data link connecting the first node to the second node, the first node comprising:

a data generation device that generates packet based data, a control information generation device that generates control information, a signal combining device that generates a combined signal in response to the control information and the data, wherein the data includes individual temporal packets of information, wherein an interpacket gap is temporally defined between said temporal packets of information, and a signal transmission device that transmits the combined signal over the data link without effecting data handling capacity of the data link;

wherein the second node comprises:

a first receiver device that receives the combined signal, and a signal divider device that splits the control information and the data from the combined signal.

* * * * *